United States Patent
Kuribayashi

(10) Patent No.: US 11,774,748 B2
(45) Date of Patent: Oct. 3, 2023

(54) IMAGE FORMING APPARATUS

(71) Applicant: TOSHIBA TEC KABUSHIKI KAISHA, Tokyo (JP)

(72) Inventor: Yasushi Kuribayashi, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 346 days.

(21) Appl. No.: 17/336,382

(22) Filed: Jun. 2, 2021

(65) Prior Publication Data
US 2022/0197020 A1    Jun. 23, 2022

(30) Foreign Application Priority Data
Dec. 18, 2020    (JP) .................................. 2020-210087

(51) Int. Cl.
*G02B 26/12*    (2006.01)
*G03G 15/043*    (2006.01)

(52) U.S. Cl.
CPC .......... *G02B 26/123* (2013.01); *G03G 15/043* (2013.01)

(58) Field of Classification Search
None
See application file for complete search history.

(56) References Cited

U.S. PATENT DOCUMENTS

| | | | |
|---|---|---|---|
| 2004/0036936 A1* | 2/2004 | Nakajima | G06K 15/1219 359/204.1 |
| 2008/0024851 A1* | 1/2008 | Sakaue | G02B 26/127 359/216.1 |
| 2011/0279624 A1 | 11/2011 | Ueda | |
| 2015/0309438 A1 | 10/2015 | Kodo et al. | |
| 2020/0021707 A1 | 1/2020 | Kojima et al. | |

FOREIGN PATENT DOCUMENTS

| | | |
|---|---|---|
| JP | 2006-085104 | 3/2006 |
| JP | 2008-233197 | 10/2008 |
| JP | 2010-014976 | 1/2010 |
| JP | 2014-134634 | 7/2014 |

* cited by examiner

*Primary Examiner* — Jennifer D. Carruth
(74) *Attorney, Agent, or Firm* — AMIN, TUROCY & WATSON, LLP

(57) ABSTRACT

A scanline curvature correction mechanism includes a holding mechanism to extend in a main scanning direction and hold an optical element in the main scanning direction, a pressing member provided near a center of the optical element in the main scanning direction and press the optical element of the optical scanning device in the sub-scanning direction, and a curvature adjustment mechanism provided on an opposite side of the pressing member with the optical element interposed therebetween and to adjust a curvature of the optical element in the sub-scanning direction. The curvature adjustment mechanism includes an eccentric cam to rotate around a rotation axis parallel to an optical axis of the optical element and include a cam portion of which an outer peripheral surface is eccentric with respect to the rotation axis, and a fixing mechanism to stepwisely fix an angular position of rotation of the eccentric cam.

17 Claims, 14 Drawing Sheets

US 11,774,748 B2

IMAGE FORMING APPARATUS

CROSS-REFERENCE TO RELATED APPLICATION

This application is based upon and claims the benefit of priority from Japanese Patent Application No. 2020-210087, filed on Dec. 18, 2020, the entire contents of which are incorporated herein by reference.

FIELD

Exemplary embodiments described herein relate to an image forming apparatus, optical scanning device, and an optical method.

BACKGROUND

An electrophotographic image forming apparatus deflects light beams to form an electrostatic latent image on a photoconductor. The image forming apparatus includes an optical scanning device that deflects light beams. The optical scanning device includes an imaging optical system that forms an image of light beams on the photoconductor. The imaging optical system includes a scanline curvature caused by the design and the components. Therefore, the image forming apparatus preferably includes a scanline curvature correction mechanism that corrects the scanline curvature included in the imaging optical system.

DETAILED DESCRIPTION

An aspect of the embodiments described herein is to provide an image forming apparatus including a scanline curvature correction mechanism that corrects a scanline curvature included in an imaging optical system of an optical scanning device.

In general, according to one embodiment, an image forming apparatus includes a photoconductor, an optical scanning device configured to form a latent image on the photoconductor, and a developing device configured to develop the latent image. The optical scanning device includes a light source configured to emit a light beam, an optical scanner configured to deflect the light beam emitted from the light source in a plane, an imaging optical system configured to image the light beam deflected by the optical scanner, and a scanline curvature correction mechanism configured to correct a scanline curvature of the imaging optical system. The scanline curvature correction mechanism includes a holding mechanism configured to extend in a main scanning direction of the optical scanning device and hold both ends of an imaging optical element included in the imaging optical system in the main scanning direction as free ends, a pressing member configured to be provided near a center of the imaging optical element in the main scanning direction and press the imaging optical element of the optical scanning device in the sub-scanning direction, and a curvature adjustment mechanism configured to be provided on an opposite side of the pressing member with the imaging optical element interposed therebetween and be able to stepwisely adjust a curvature of the imaging optical element in the sub-scanning direction. The curvature adjustment mechanism includes an eccentric cam configured to be able to rotate around a rotation axis parallel to an optical axis of the imaging optical element and include a cam portion of which an outer peripheral surface is eccentric with respect to the rotation axis, and a fixing mechanism configured to stepwisely fix an angular position of rotation of the eccentric cam.

Hereinafter, an image forming apparatus according to an embodiment is described with reference to the drawings. In each drawing used for describing the following embodiment, the scale of each part may be changed as appropriate. In addition, in each drawing used for describing the following embodiment, for the sake of explanation, a configuration may be omitted.

Figure 1:
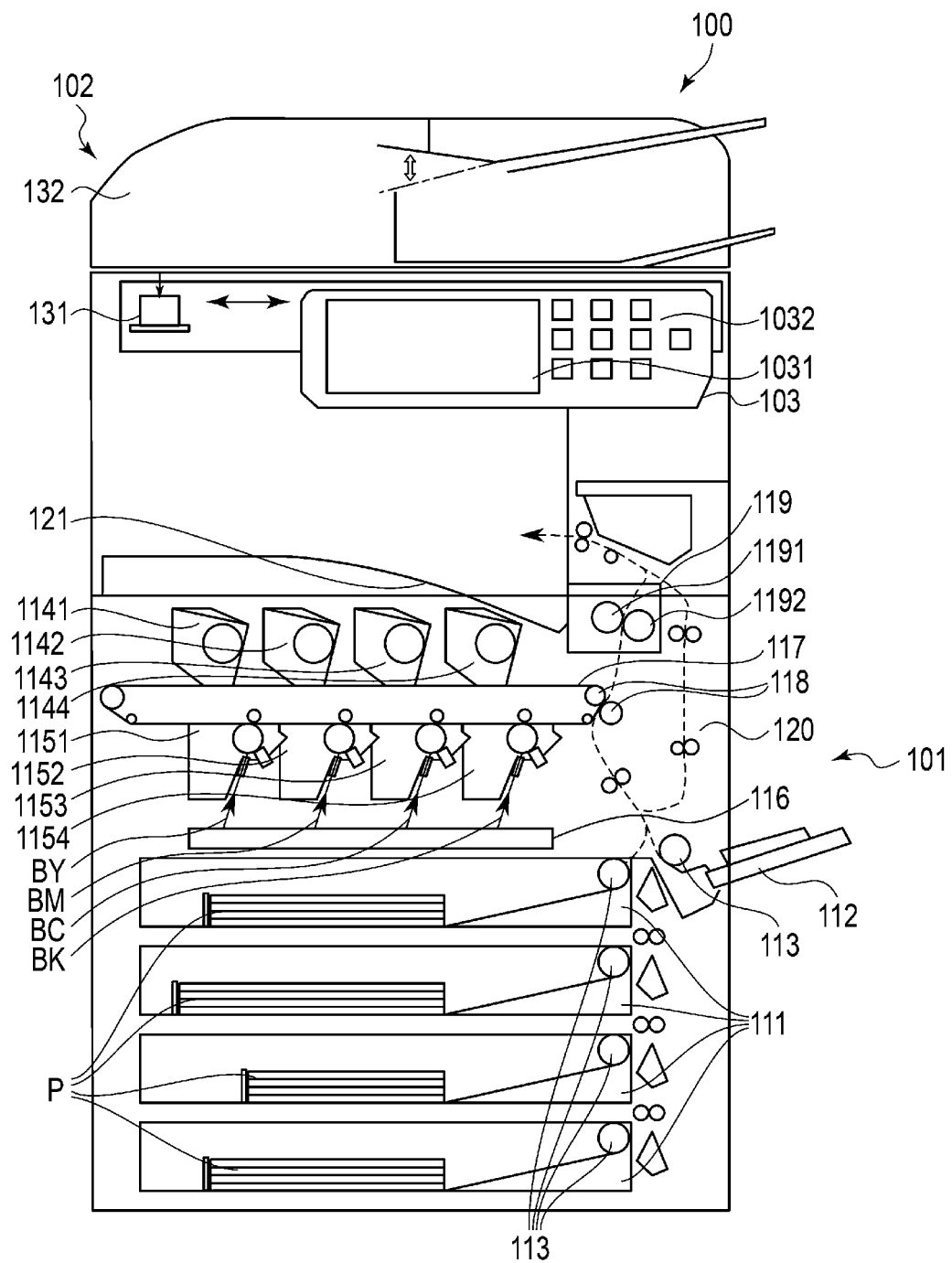
FIG. 1 is a diagram illustrating a schematic configuration of an image forming apparatus according to an embodiment.

FIG. 1 is a diagram illustrating a schematic configuration of an image forming apparatus 100 according to an embodiment. For example, the image forming apparatus 100 is an apparatus including a printing function such as a multifunction peripheral (MFP), a copying machine, a printer, or a facsimile. However, hereinafter, it is assumed that the image forming apparatus 100 is an MFP.

The image forming apparatus 100 includes a printing function, a scanning function, a copying function, a decoloring function, a facsimile function, and the like. The printing function is a function of forming an image with a recording agent such as a toner on an image formation medium P and the like. The image formation medium P is, for example, sheet-like paper. The scanning function is a function of reading an image from a document on which an image is formed. The copying function is a function of printing an image read from a document or the like by using a scanning function on the image formation medium P using a printing function. The decoloring function is a function of decoloring an image formed with a decolorable recording agent on the image formation medium P.

The image forming apparatus 100 includes a printer 101, a scanner 102, and an operation panel 103.

The printer 101 is a device including a printing function. The printer 101 includes a paper feed tray 111, a manual feed tray 112, and a paper feed roller 113.

The paper feed tray 111 contains the image formation medium P using printing. The manual feed tray 112 is a table for manually feeding the image formation medium P.

The paper feed roller 113 is rotated by a motor to selectively carry out the image formation medium P from any one of the paper feed tray 111 and the manual feed tray 112.

The paper feed tray 111, the manual feed tray 112, and the paper feed roller 113 configure an image forming medium supply device that supplies an image forming medium.

The printer 101 further includes four toner cartridges 1141, 1142, 1143, and 1144, four image forming units 1151, 1152, 1153, and 1154, an optical scanning device 116, a transfer belt 117, a secondary transfer roller 118, and a fixing unit 119.

The toner cartridges 1141 to 1144 store recording agents supplied from the image forming units 1151 to 1154, respectively. For example, the recording agent is a toner. The toner cartridge 1141 stores a recording agent of a yellow (Y) color. The toner cartridge 1142 stores a recording agent of a magenta (M) color. The toner cartridge 1143 stores a recording agent of a cyan (C) color. The toner cartridge 1144 stores a recording agent of a black (K) color. The combination of the colors of the recording agents is not limited to CMYK, and may be a combination of the other colors. The recording agent may be a recording agent that is decolored at a temperature higher than a predetermined temperature.

The image forming units 1151 to 1154 receive the supply of recording agents from the toner cartridges 1141 to 1144, respectively, and form images of different colors. The image forming unit 1151 forms an image of a yellow (Y) color. The image forming unit 1152 forms an image of a magenta (M) color. The image forming unit 1153 forms an image of a cyan (C) color. The image forming unit 1154 forms an image of a black (K) color.

Figure 2:
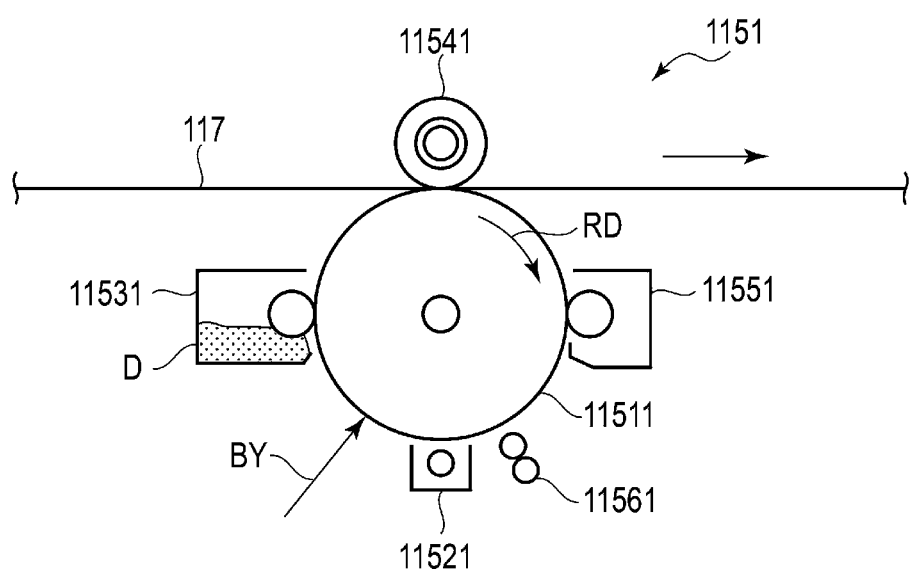
FIG. 2 is a diagram illustrating a schematic configuration of an image forming unit in FIG. 1.

The image forming units 1151 to 1154 have the same configuration except for the difference in the recording agents. Here, with reference to FIG. 2, the image forming unit 1151 is representatively described. FIG. 2 is a schematic diagram illustrating a schematic configuration of the image forming unit 1151.

The image forming unit 1151 includes a photoconductor drum 11511, a charging unit 11521, a developing device 11531, a primary transfer roller 11541, a cleaner 11551, and a static elimination lamp 11561.

The photoconductor drum 11511 is irradiated with a light beam BY applied from the optical scanning device 116. Accordingly, an electrostatic latent image is formed on the front surface of the photoconductor drum 11511.

The charging unit 11521 charges the front surface of the photoconductor drum 11511 with a predetermined positive charge.

The developing device 11531 develops an electrostatic latent image on the front surface of the photoconductor drum 11511 by using a recording agent D supplied from the toner cartridge 1141. Accordingly, a transfer source image is formed with the recording agent D on the front surface of the photoconductor drum 11511.

The primary transfer roller 11541 is disposed at a position that faces the photoconductor drum 11511 with the transfer belt 117 interposed therebetween. The primary transfer roller 11541 generates a transfer voltage with the photoconductor drum 11511. Accordingly, the primary transfer roller 11541 transfers a transfer source image formed on the front surface of the photoconductor drum 11511 to the transfer belt 117 that is in contact with the photoconductor drum 11511 (primary transfer).

The cleaner 11551 removes the recording agent D remaining on the front surface of the photoconductor drum 11511.

The static elimination lamp 11561 removes charges remaining on the front surface of the photoconductor drum 11511.

In FIG. 1, the optical scanning device 116 is referred to as a laser scanning unit (LSU). The optical scanning device 116 irradiates the image forming units 1151, 1152, 1153, and 1154 with the light beams BY, BM, BC, and BK, respectively, in response to the input image data. The light beams BY, BM, BC, and BK are to form the images of the Y, M, C, and K colors, respectively. The optical scanning device 116 controls the light beam BY in response to a Y component of the image data to form the electrostatic latent image on the front surface of the photoconductor drum 11511 of the image forming unit 1151. In the same manner, the optical scanning device 116 controls the light beams BM, BC, and BK in response to M, C, and K components of the image data to form electrostatic latent images on the front surfaces of the photoconductor drums of the image forming units 1152, 1153, and 1154.

The input image data is image data, for example, read from a document by the scanner 102. In addition, the input image data is image data sent from another apparatus and received by the image forming apparatus 100.

The transfer belt 117 is, for example, an endless belt and can rotate by the movement of the roller. The transfer belt 117 conveys the transfer source images transferred from the image forming units 1151 to 1154 to the position of the secondary transfer roller 118, by rotation.

The secondary transfer roller 118 includes two rollers facing to each other. The secondary transfer roller 118 transfers a transfer source image formed on the transfer belt 117 to the image formation medium P passing through a portion between the transfer belt 117 and the secondary transfer roller 118 (secondary transfer).

The photoconductor drum 11511, the primary transfer roller 11541, the transfer belt 117, and the secondary transfer roller 118 configure a transfer device that transfers a transfer source image to an image forming medium.

The printer 101 further includes the fixing unit 119, a double-sided unit 120, and a paper ejection tray 121.

The fixing unit 119 heats and pressurizes the image formation medium P. Accordingly, the fixing unit 119 fixes the image transferred to the image formation medium P. The fixing unit 119 includes a heating unit 1191 and a pressure roller 1192 that face each other.

The heating unit 1191 is a roller including a heat source for heating the heating unit 1191. The heat source is, for example, a heater. The roller heated by the heat source heats the image formation medium P.

The pressure roller 1192 pressurizes the image formation medium P that passes through a portion between the pressure roller 1192 and the heating unit 1191.

The double-sided unit 120 causes the image formation medium P to be in a state in which printing can be performed on the back surface. For example, the double-sided unit 120 reverses the front and back of the image formation medium P by switching back the image formation medium P by using a roller or the like.

The paper ejection tray 121 is a table that ejects the image formation medium P on which printing is completed.

The scanner 102 is a device including a scanning function. The scanner 102 is, for example, an optical reduction system including an image capturing element such as a charge-coupled device (CCD) image sensor. In addition, the scanner 102 is a contact image sensor (CIS) system including an image capturing element such as a complementary metal-oxide-semiconductor (CMOS) image sensor. Otherwise, the scanner 102 may be in another known system. The scanner 102 reads an image from a document or the like. The scanner 102 includes a reading module 131 and a document feed device 132.

The reading module 131 converts incident light to a digital signal by an image sensor. Accordingly, the reading module 131 reads an image from the front surface of the document.

The document feed device 132 is, for example, referred to as an auto document feeder (ADF). The document feed device 132 sequentially conveys documents mounted on a tray for the documents. From the conveyed documents, images are read by the scanner 102. In addition, the document feed device 132 may include a scanner for reading an image from the back surface of the document. In addition, the surface from which the images are read by the scanner 102 is the front surface.

The operation panel 103 includes a man-machine interface that performs input and output between the image forming apparatus 100 and the operator of the image forming apparatus 100. The operation panel 103 includes, for example, a touch panel 1031 and an input device 1032.

The touch panel 1031 is obtained, for example, by stacking a display such as a liquid crystal display or an organic EL display and a pointing device by a touch input. The display included in the touch panel 1031 functions as a display device that displays a screen for notifying an operator of the image forming apparatus 100 of various kinds of information. The touch panel 1031 functions as an input device that receives a touch operation by an operator.

The input device 1032 receives an operation of the operator of the image forming apparatus 100. The input device 1032 is, for example, a keyboard, a keypad, or a touchpad.

Figure 3:
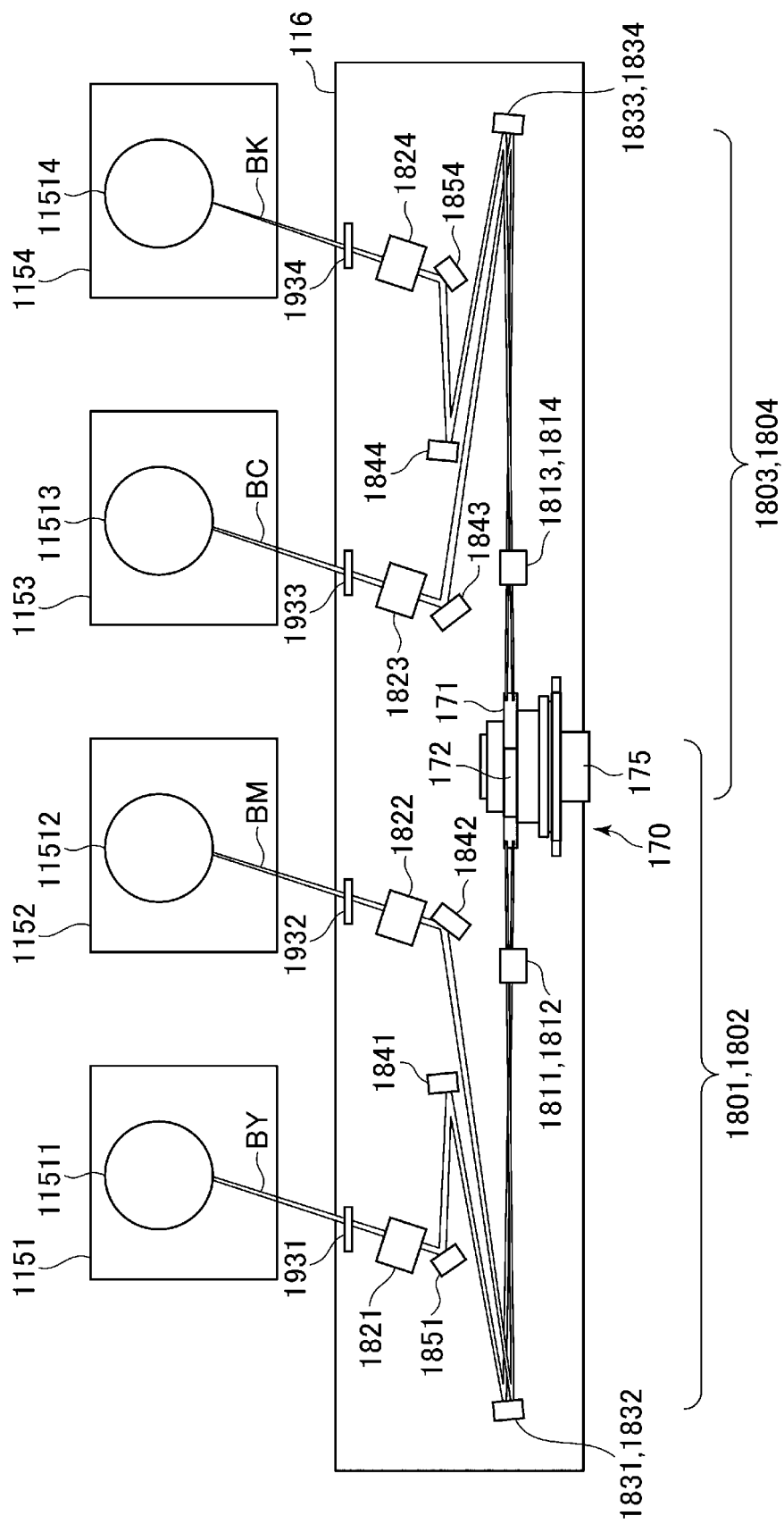
FIG. 3 is a diagram illustrating an example of an optical scanning device in FIG. 1.
Figure 4:
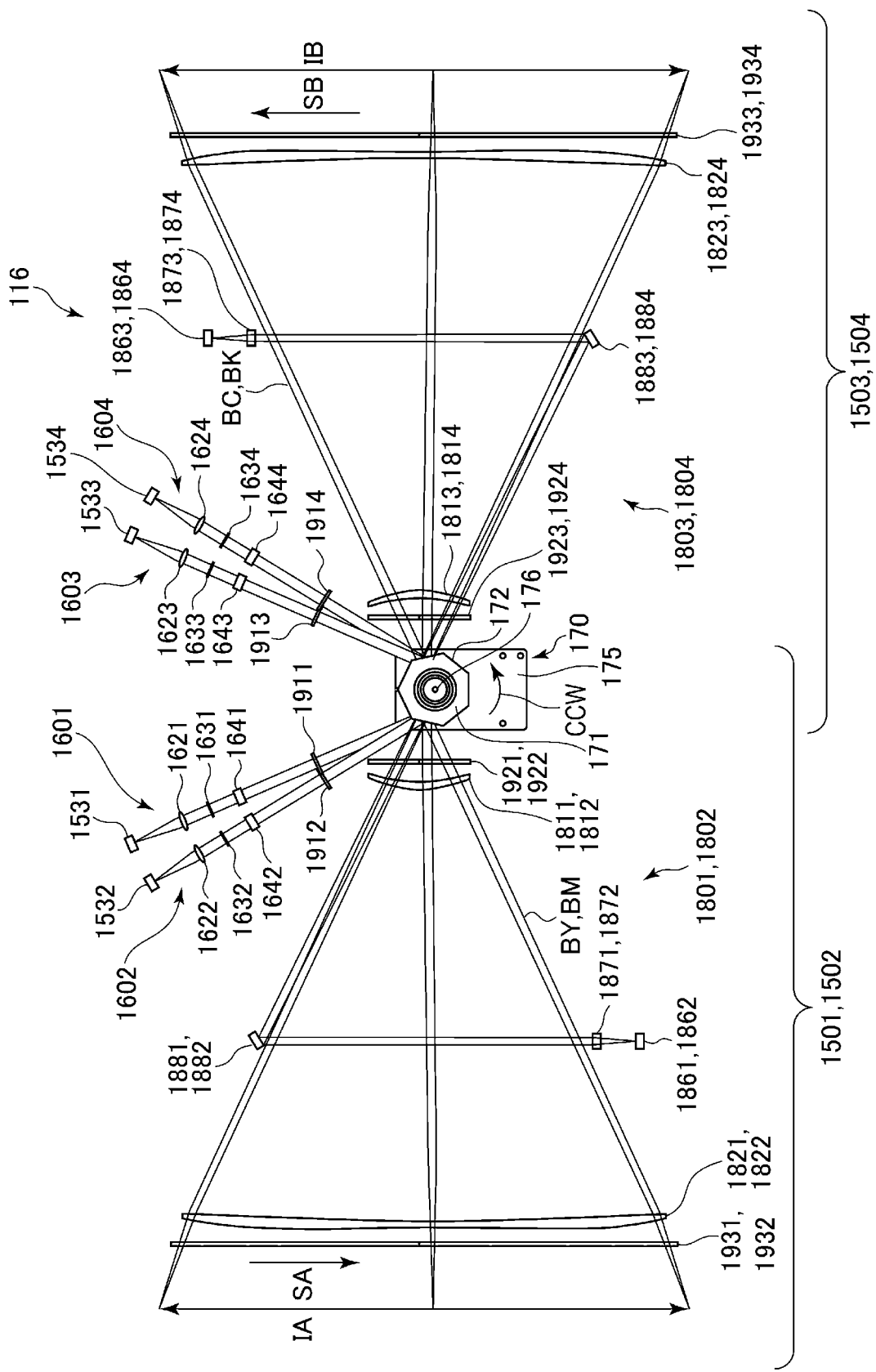
FIG. 4 is a diagram illustrating an example of an optical system of the optical scanning device illustrated in FIG. 1 which is developed on a plane.

With reference to FIGS. 3 and 4, the optical scanning device 116 is further described. FIG. 3 is a diagram illustrating an example of the optical scanning device 116. FIG. 4 is a diagram illustrating an example of an optical system of the optical scanning device 116 which is developed on a plane.

The optical scanning device 116 includes four light sources 1531, 1532, 1533, and 1534 and an optical scanner 170.

The light sources 1531, 1532, 1533, and 1534 emit the light beams BY, BM, BC, and BK, respectively.

The optical scanner 170 dynamically biases the light beams BY, BM, BC, and BK emitted from the light sources 1531, 1532, 1533, and 1534 and deflects the light beams BY, BM, BC, and BK in the plane.

For example, the optical scanner 170 is configured with a polygon mirror scanner and includes a polygon mirror 171, and a motor 175.

The polygon mirror 171 is a regular polygonal mirror of which each side surface is reflecting surfaces 172. The polygon mirror 171 illustrated in FIGS. 3 and 4 is a regular seven-sided columnar mirror with the seven reflecting surfaces 172. The polygon mirror 171 can rotate about a rotation axis parallel to each of the reflecting surfaces 172. In addition, for example, a rotation axis 176 of the motor 175 is orthogonal to the rotation axes of the photoconductor drums 11511, 11521, 11531, and 11541.

The motor 175 rotates the polygon mirror 171 in a rotation direction CCW at a predetermined speed. For example, the rotation axis 176 of the motor 175 is parallel to the reflecting surfaces 172 of the polygon mirror 171.

The optical scanning device 116 further includes four pre-deflection optical systems 1601, 1602, 1603, and 1604, and four post-deflection optical systems 1801, 1802, 1803, and 1804.

In FIGS. 3 and 4, the pre-deflection optical systems 1601 and 1602 and the post-deflection optical systems 1801 and 1802 are disposed on the left side of the paper, and the pre-deflection optical systems 1603 and 1604 and the post-deflection optical systems 1803 and 1804 are disposed on the right side of the paper.

As illustrated in FIG. 4, the pre-deflection optical systems 1601, 1602, 1603, and 1604 respectively guide the light beams BY, BM, BC, and BK respectively emitted from the light sources 1531, 1532, 1533, and 1534 to the optical scanner 170.

The pre-deflection optical system 1601 includes a collimator lens 1621, an aperture 1631, and a cylinder lens 1641. In the same manner, the pre-deflection optical systems 1602, 1603, and 1604 include collimator lenses 1622, 1623, and 1624, apertures 1632, 1633, and 1634, and cylinder lenses 1642, 1643, and 1644, respectively.

The collimator lenses 1621, 1622, 1623, and 1624 change the light beams BY, BM, BC, and BK respectively emitted from the light sources 1531, 1532, 1533, and 1534 to parallel beams.

The apertures 1631, 1632, 1633, and 1634 have the shapes of the light beams BY, BM, BC, and BK that pass through the collimator lenses 1621, 1622, 1623, and 1624, respectively.

The cylinder lenses 1641, 1642, 1643, and 1644 change the light beams BY, BM, BC, and BK that respectively pass through the apertures 1631, 1632, 1633, and 1634 to flat light beams.

As illustrated in FIG. 3, the post-deflection optical systems 1801, 1802, 1803, and 1804 guide the light beams BY, BM, BC, and BK biased by the optical scanner 170 respectively to the image forming units 1151, 1152, 1153, and 1154, respectively.

As illustrated in FIGS. 3 and 4, the post-deflection optical system 1801 is an imaging optical system that images the light beam BY on the photoconductor drum 11511. The post-deflection optical system 1801 includes an fθ lens 1811 and an fθ lens 1821. The fθ lens 1811 and the fθ lens 1821 are imaging optical elements that image the light beam BY in cooperation. In the same manner, the post-deflection optical systems 1802, 1803, and 1804 are imaging optical systems that image the light beams BM, BC, and BK on the photoconductor drums 11521, 11531, and 11541, respectively. The post-deflection optical systems 1802, 1803, and 1804 include the fθ lenses 1812, 1813, and 1814, the fθ lenses 1822, 1823, and 1824, respectively. The fθ lenses 1812, 1813, and 1814 and the fθ lenses 1822, 1823, and 1824 are imaging optical elements that image the light beams BM, BC, and BK in cooperation, respectively.

The fθ lens 1811 and the fθ lens 1821 cooperate to bias the light beam BY to be perpendicularly incident to the front surface of the photoconductor drum 11511 and image the light beam BY on the front surface of the photoconductor drum 11511. In the same manner, the fθ lenses 1812, 1813, and 1814 and the fθ lenses 1822, 1823, and 1824 cooperate to bias the light beams BM, BC, and BK to be perpendicularly incident to the front surfaces of the photoconductor drums 11521, 11531, and 11541 and image the light beams BM, BC, and BK on the front surfaces of the photoconductor drums 11521, 11531, and 11541, respectively.

In FIG. 4, for convenience, the two fθ lenses 1811 and 1812 are illustrated to be overlapped with each other, and the two fθ lenses 1813 and 1814 are illustrated to be overlapped with each other. In the same manner, the two fθ lenses 1821 and 1822 are illustrated to be overlapped with each other, and two fθ lenses 1823 and 1824 are illustrated to be overlapped with each other. For example, as schematically illustrated in FIG. 3, the two fθ lenses 1811 and 1812 may be configured with one optical element, and the two fθ lenses 1813 and 1814 may be configured with one optical element.

In addition, as illustrated in FIG. 3, the post-deflection optical system 1801 includes three folding mirrors 1831, 1841, and 1851 in order to bend an optical path between the two fθ lenses 1811 and 1821. The post-deflection optical system 1802 includes two folding mirrors 1832 and 1842 in order to bend an optical path between the two fθ lenses 1812 and 1822. The post-deflection optical system 1803 includes two folding mirrors 1833 and 1843 in order to bend an optical path between the two fθ lenses 1813 and 1823. The post-deflection optical system 1804 includes three folding mirrors 1834, 1844, and 1854 in order to bend an optical path between the two fθ lenses 1814 and 1824. For example, the two folding mirrors 1831 and 1832 may be configured with one mirror, and the two folding mirrors 1833 and 1834 may be configured with one mirror.

The post-deflection optical system 1801 further includes a synchronous optical system that synchronizes the light beam BY, and this synchronous optical system includes a photodetector 1861, an optical path correction element 1871, and a folding mirror 1881. In the same manner, the post-deflection optical systems 1802, 1803, and 1804 include synchronous optical systems that synchronize the light beams BM, BC, and BK, respectively, and these synchronous optical systems include photodetectors 1862, 1863, and 1864, optical path correction elements 1872, 1873, and 1874, and folding mirrors 1882, 1883, and 1884, respectively.

In FIG. 4, for convenience, the two photodetectors 1861 and 1862 are illustrated to be overlapped with each other, and the two photodetectors 1863 and 1864 are illustrated to be overlapped with each other. In the same manner, the two optical path correction elements 1871 and 1872 are illustrated to be overlapped with each other, and the two optical path correction elements 1873 and 1874 are illustrated to be overlapped with each other. Further, the two folding mirrors 1881 and 1882 are illustrated to be overlapped with each other, and the two folding mirrors 1883 and 1884 are illustrated to be overlapped with each other.

In other words, the optical scanning device 116 includes four scanning optical systems 1501, 1502, 1503, and 1504. The four scanning optical systems 1501, 1502, 1503, and 1504 deflect the light beams BY, BM, BC, and BK respectively and further guide the light beams to the image forming units 1151, 1152, 1153, and 1154.

The scanning optical systems 1501, 1502, 1503, and 1504 include the light sources 1531, 1532, 1533, and 1534, the pre-deflection optical systems 1601, 1602, 1603, and 1604, the optical scanner 170, the post-deflection optical systems 1801, 1802, 1803, and 1804, respectively. That is, the four scanning optical systems 1501 to 1504 share the one optical scanner 170.

As illustrated in FIG. 4, the scanning optical systems 1501 and 1502 respectively deflect the light beams BY and BM emitted from the light sources 1531 and 1532 in the direction indicated by an arrow SA in the area of an image area IA. As illustrated in FIG. 3, the scanning optical systems 1501 and 1502 image the light beams BY and BM on the front surfaces of the photoconductor drums 11511 and 11521 of the image forming units 1151 and 1152. Accordingly, the light beams BY and BM linearly move on the front surfaces of the photoconductor drums 11511 and 11521. The front surfaces of the photoconductor drums 11511 and 11521 move by the rotation of the photoconductor drums 11511 and 11521. As a result, electrostatic latent images are formed on the front surfaces of the photoconductor drums 11511 and 11521.

The scanning optical systems 1503 and 1504 respectively deflect the light beams BC and BK emitted from the light sources 1533 and 1534 in the direction indicated by an arrow SB in the area of an image area IB. As illustrated in FIG. 3, the scanning optical systems 1503 and 1504 image the light beams BC and BK on the front surfaces of the photoconductor drums 11531 and 11541 of the image forming units 1153 and 1154. Accordingly, the light beams BC and BK linearly move on the front surfaces of the photoconductor drums 11531 and 11541. The front surfaces of the photoconductor drums 11531 and 11541 move by the rotation of the photoconductor drums 11531 and 11541. As a result, electrostatic latent images are formed on the photoconductor drums 11531 and 11541.

The scanning direction of the light beams BY and BM, that is, the direction indicated by the arrow SA is parallel to the rotation axes of the photoconductor drums 11511 and 11521. Therefore, the movement direction of the front surface of the photoconductor drums 11511 and 11521 is perpendicular to the scanning direction of the light beams BY and BM. In the same manner, the scanning direction of the light beams BC and BK, that is, the direction indicated by the arrow SB is parallel to the rotation axes of the photoconductor drums 11531 and 11541. Accordingly, the movement direction of the front surfaces of the photoconductor drums 11531 and 11541 are perpendicular to the scanning direction of the light beams BC and BK.

Hereinafter, the scanning direction of the light beams BY and BM and the scanning direction of the light beams BC and BK are referred to as the main scanning direction, and the direction perpendicular to the scanning direction of the light beams BY and BM and the scanning direction of the light beams BC and BK are referred to as the sub-scanning direction.

The optical scanning device 116 includes first cover glasses 1911, 1912, 1913, and 1914, second cover glasses 1921, 1922, 1923, and 1924, and third cover glasses 1931, 1932, 1933, and 1934.

The first cover glasses 1911 to 1914 are disposed on the optical paths of the pre-deflection optical systems 1601 to 1604, respectively. The second cover glasses 1921 to 1924 and the third cover glasses 1931 to 1934 are disposed on the optical paths of the post-deflection optical systems 1801 to 1804, respectively.

The first cover glasses 1911 to 1914 are disposed between the cylinder lenses 1641 to 1644 and the optical scanner 170, respectively. The second cover glasses 1921 to 1924 are disposed between the optical scanner 170 and the fθ lenses 1811 to 1814, respectively. The third cover glasses 1931 to 1934 are disposed between the fθ lenses 1821 to 1824 and the image forming units 1151 to 1154, respectively.

The first cover glasses 1911 to 1914 and the second cover glasses 1921 to 1924 are provided in order to prevent the leakage of the wind noise generated if the polygon mirror 171 rotates. The third cover glasses 1931 to 1934 cover the outlet from which the light beams BY, BM, BC, and BK are emitted, in the housing of the optical scanning device 116.

The fθ lenses 1811 to 1814 and the fθ lens 1821 to 1824 are long optical elements and extend in the main scanning direction. In addition, the second cover glasses 1921 to 1924 and the third cover glasses 1931 to 1934 are long optical elements and extend in the main scanning direction.

The fθ lens 1821 to 1824 are attached to fθ lens holder mechanisms, respectively, and are mounted on the optical scanning device 116 by the attachment of these fθ lens holder mechanisms to the optical scanning device 116. All of the fθ lens holder mechanisms to which the fθ lenses 1821 to 1824 are attached respectively are the same structural bodies. In other words, the fθ lens holder mechanisms with the same configuration are used for the fθ lenses 1821 to 1824.

Hereinafter, with respect to FIGS. 5 to 8, the fθ lens 1821 and an fθ lens holder mechanism 200 thereof are representatively described. That is, hereinafter, the description of the fθ lens 1821 is applied to the other fθ lenses 1822, 1823, and 1824 in the same manner, and the description of the fθ lens holder mechanism 200 of the fθ lens 1821 is applied to the fθ lens holder mechanisms 200 of the other fθ lenses 1822, 1823, and 1824, in the same manner.

Figure 5:
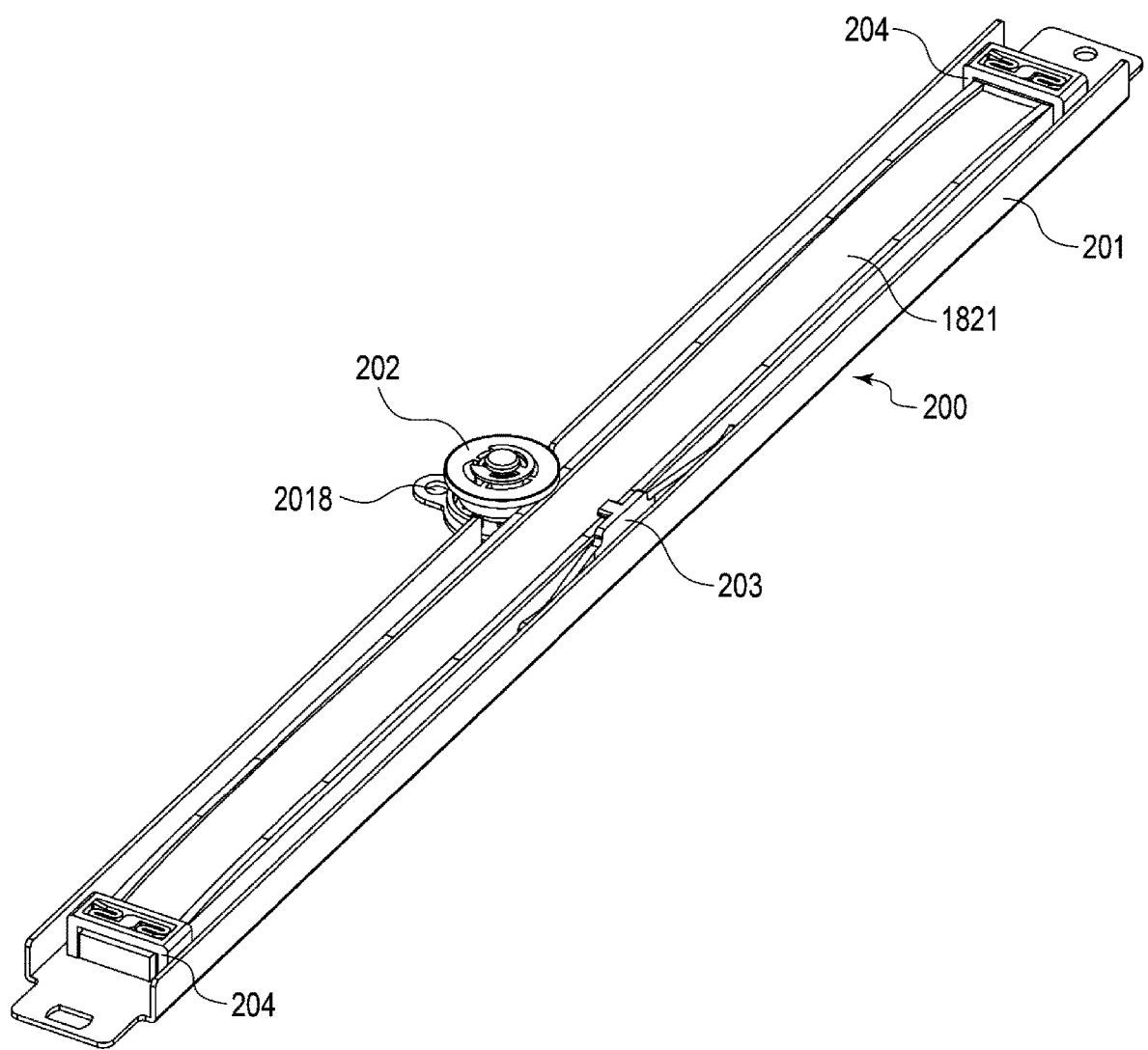
FIG. 5 is a perspective view illustrating an fθ lens holder mechanism.
Figure 6:
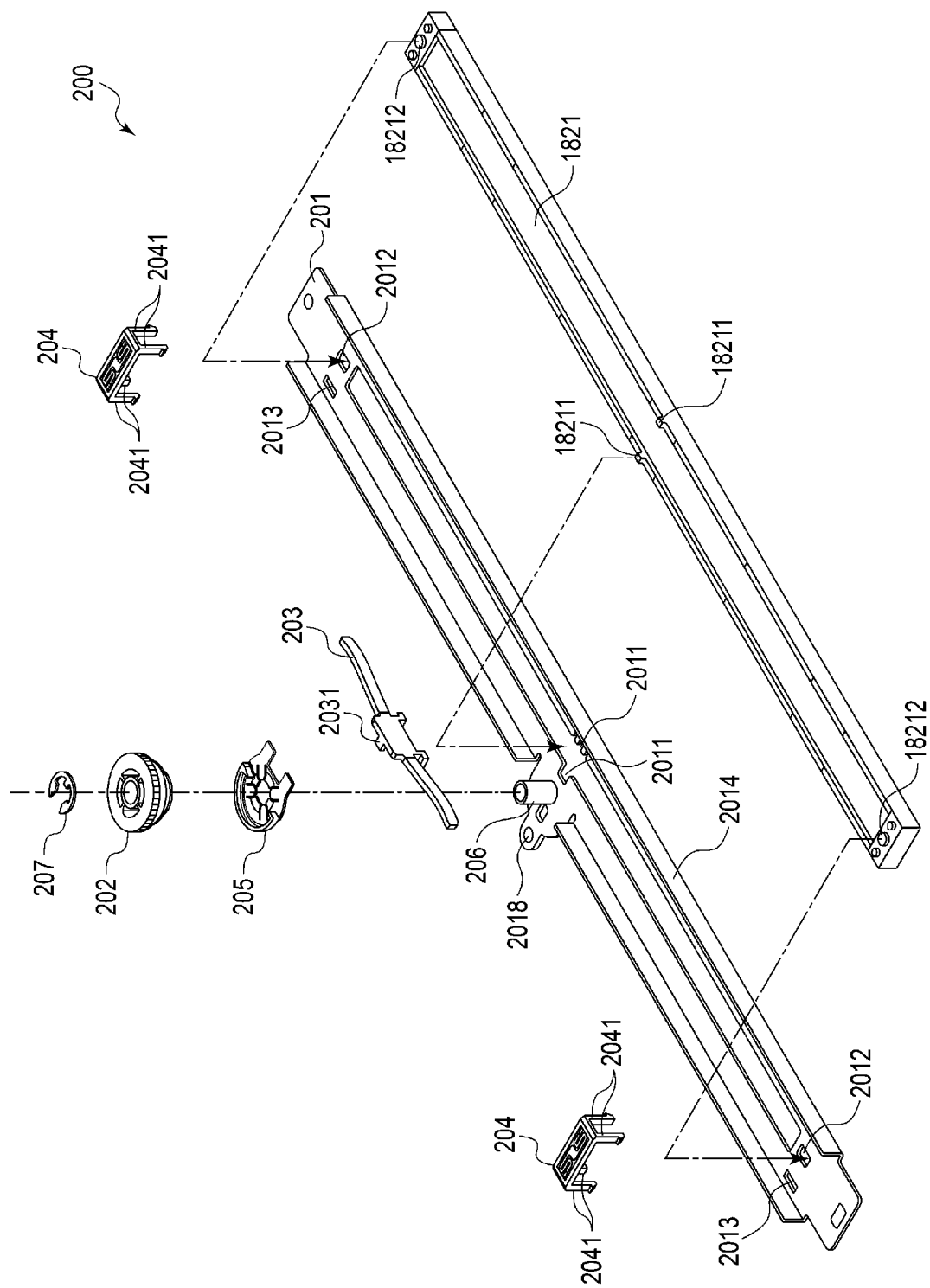
FIG. 6 is an exploded perspective view of the fθ lens holder mechanism illustrated in FIG. 5.
Figure 7:
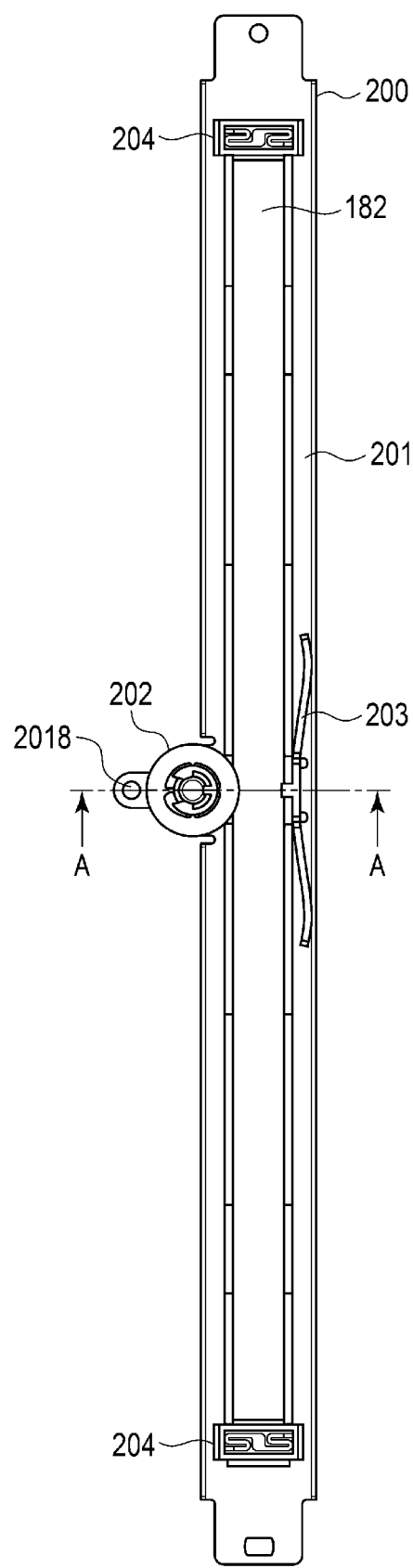
FIG. 7 is a plan view of an fθ lens holder mechanism illustrated in FIGS. 5 and 6.
Figure 8:
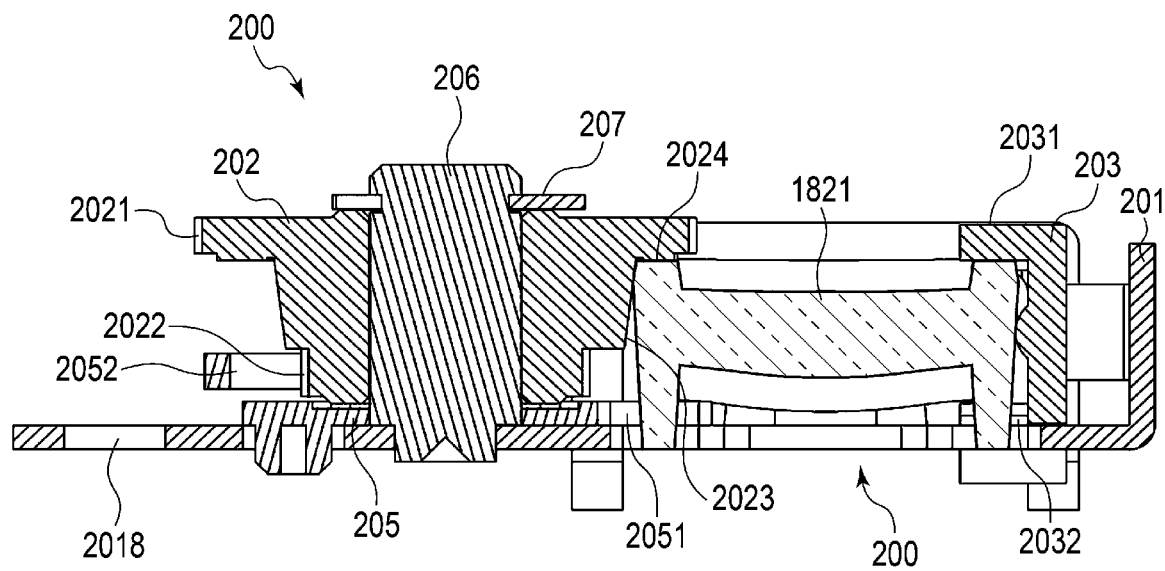
FIG. 8 is a cross-sectional view of the fθ lens holder mechanism taken along line A-A illustrated in FIG. 7.

FIG. 5 is a perspective view of the fθ lens holder mechanism 200 of the fθ lens 1821. FIG. 6 is an exploded perspective view of the fθ lens holder mechanism 200. FIG. 7 is a plan view of the fθ lens holder mechanism 200. FIG. 8 is a cross-sectional view of the fθ lens holder mechanism 200 taken along the line A-A illustrated in FIG. 7.

The fθ lens holder mechanism 200 includes a warpage correction mechanism that corrects a warpage of the fθ lens 1821 in the optical axis direction and a scanline curvature correction mechanism that corrects a scanline curvature of the post-deflection optical system 1801 that is the imaging optical system.

The fθ lens 1821 is a long optical element and is manufactured by resin molding. Therefore, a warpage easily occurs in the fθ lens 1821. The warpage correction mechanism is to correct a warpage in the optical axis direction that occurs in the fθ lens 1821.

The fθ lens 1821 is in the downstream of the post-deflection optical system 1801. Specifically, an optical element that is positioned at the most downstream side of the post-deflection optical system 1801 is the third cover glass 1931, and the fθ lens 1821 is positioned in front of the third cover glass 1931. Therefore, the scanline curvature of the post-deflection optical system 1801 is preferably corrected with the fθ lens 1821.

The scanline curvature correction mechanism is to correct the scanline curvature of the post-deflection optical system 1801 by curving the fθ lens 1821 in the sub-scanning direction. Here, the scanline curvature of the post-deflection optical system 1801 is determined by adding up the scanline curvature of the post-deflection optical system 1801 in design and scanline curvatures caused by the curvatures of the folding mirrors 1831, 1841, and 1851 included in the post-deflection optical system 1801 in the longitudinal direction in manufacturing.

As described above, the post-deflection optical system 1801 includes the three folding mirrors 1831, 1841, and 1851 and the post-deflection optical system 1802 includes the two folding mirrors 1832 and 1842, the post-deflection optical system 1803 includes the two folding mirrors 1833 and 1843, and the post-deflection optical system 1804 includes the three folding mirrors 1834, 1844, and 1854.

Therefore, the numbers of times of folding of the light beams in the post-deflection optical systems 1801, 1802, 1803, and 1804 are odd numbers and even numbers in a mixture. Therefore, it is likely that the scanline curvatures caused by the folding mirrors 1831 to 1834, 1841 to 1844, 1851, and 1854 occur on both sides of the positive side and the negative side in the sub-scanning direction. Therefore, the fθ lens holder mechanisms 200 used in common with respect to the fθ lenses 1821, 1822, 1823, and 1824 are required to be able to correct the scanline curvatures on any one of the positive side and the negative side.

As illustrated in FIGS. 5 to 8, the fθ lens holder mechanism 200 includes a holder frame 201. The holder frame 201 is a member to be a frame of the fθ lens holder mechanism 200. The holder frame 201 is manufactured with a steel plate or the like so that the fθ lens 1821 does not warp. The holder frame 201 has a U-shape when viewed from the main scanning direction.

As illustrated in FIG. 6, the fθ lens 1821 includes two central protrusions 18211 and two end bosses 18212 on the surface facing the holder frame 201. The two end bosses 18212 are provided in both end portions in the main scanning direction one by one. The two central protrusions 18211 are provided in the central portion in the main scanning direction and in both end portions in the sub-scanning direction one by one.

The holder frame 201 includes two central grooves 2011 that respectively engage with the two central protrusions 18211 of the fθ lens 1821 and the two end elongated holes 2012 that respectively engage with the two end bosses 18212 of the fθ lens 1821.

The dimension of the central groove 2011 in the main scanning direction is substantially the same as the dimension of the central protrusion 18211 in the main scanning direction. Specifically, the central protrusions 18211 of the fθ lens 1821 and the central grooves 2011 of the holder frame 201 are designed so that the central protrusion 18211 fits into the central groove 2011 in the main scanning direction. Therefore, if the central protrusion 18211 engages with the central groove 2011, the position of the central portion of the fθ lens 1821 is determined with respect to the main scanning direction.

The distance between the two central grooves 2011 in the sub-scanning direction is longer than the distance between the two central protrusions 18211 in the sub-scanning direction. Therefore, if the central protrusion 18211 engages with the central groove 2011, the central portion of the fθ lens 1821 can move with respect to the sub-scanning direction.

The dimension of the end elongated hole 2012 in the sub-scanning direction is substantially the same as the dimension of the end boss 18212 in the sub-scanning direction. Specifically, the end boss 18212 of the fθ lens 1821 and the end elongated hole 2012 of the holder frame 201 are designed so that the end boss 18212 fits into the end elongated hole 2012 in the sub-scanning direction. Therefore, if the end boss 18212 engages with the end elongated hole 2012, the position of the end portion of the fθ lens 1821 is determined with respect to the sub-scanning direction.

The dimension of the end elongated hole 2012 in the main scanning direction is larger than the dimension of the end boss 18212 in the main scanning direction. Therefore, if the end boss 18212 engages with the end elongated hole 2012, the end portion of the fθ lens 1821 can move in the main scanning direction.

Therefore, in a state in which the central protrusions 18211 and the end bosses 18212 of the fθ lens 1821 engage with the central grooves 2011 and the end elongated holes 2012 of the holder frame 201 respectively, the fθ lens 1821 can curve in the sub-scanning direction.

The fθ lens holder mechanism 200 further includes two end pressing members 204. The end pressing members 204 are provided to the both end portions of the fθ lens 1821 in the main scanning direction one by one. The end pressing members 204 include a pair of foot portions 2041 in each of the both end portions in the sub-scanning direction. The pair of foot portions 2041 extend toward the holder frame 201 in the optical axis direction. Therefore, the end pressing member 204 has an inverted U-shape when viewed from the main scanning direction. The pair of foot portions 2041 can be elastically deformed in the main scanning direction. In addition, the pair of foot portions 2041 include retaining claws on the outside of the tip end portion in the main scanning direction.

The holder frame 201 includes a pair of end holes 2013 that engage with the foot portions 2041 of the end pressing members 204 in each of the both end portions in the main scanning direction. In FIG. 6, only one of the pair of end holes 2013 is illustrated, and the other one is position behind a side wall portion 2014 of the holder frame 201 and thus is not illustrated.

The end pressing members 204 are disposed so as to straddle the end portions of the fθ lens 1821, and tip end portions of two pairs of foot portions 2041 are inserted into the two end holes 2013 of the holder frame 201, respectively and to be attached to the holder frame 201. The distance between the pair of foot portions 2041 is narrowed to be inserted into one end hole 2013, and returns to the original shape after the insertion. Accordingly, claws formed in the tip end portions of the foot portions 2041 are caught by the holder frame 201, and falling of the end pressing members 204 from the holder frame 201 is prevented.

Accordingly, the both end portions of the fθ lens 1821 in the main scanning direction are movably held in the main scanning direction by the holder frame 201 and the pair of end pressing members 204. In other words, the holder frame 201 and the pair of end pressing members 204 cooperate to configure a holding mechanism that holds the both end portions of the fθ lens 1821 in the main scanning direction as free ends in the main scanning direction.

The end pressing members 204 are designed so that the end portions of the fθ lens 1821 are disposed between the two pairs of foot portions 2041 substantially without gaps. Therefore, if the end pressing members 204 are attached to the holder frame 201, the positions of the end portions of the fθ lens 1821 are determined with respect to the sub-scanning direction.

As illustrated in FIGS. 5 to 8, the fθ lens holder mechanism 200 further includes a central pressing member 203 provided near the center of the fθ lens 1821 in the main scanning direction and a curvature adjustment mechanism provided on the opposite side of the central pressing member 203 with the fθ lens 1821 interposed therebetween, as a scanline curvature correction mechanism.

The central pressing member 203 is to press the fθ lens 1821 in the sub-scanning direction. The central pressing member 203 is configured with a member that can be elastically deformed and is configured in a bow shape in the main scanning direction. That is, the central pressing member 203 can be elastically deformed in the sub-scanning direction.

The central pressing member 203 is disposed between the fθ lens 1821 and the side wall portion 2014 of the holder frame 201 in an elastically deformed state. Accordingly, the central pressing member 203 presses the central portion of the fθ lens 1821 in the sub-scanning direction.

Figure 17:
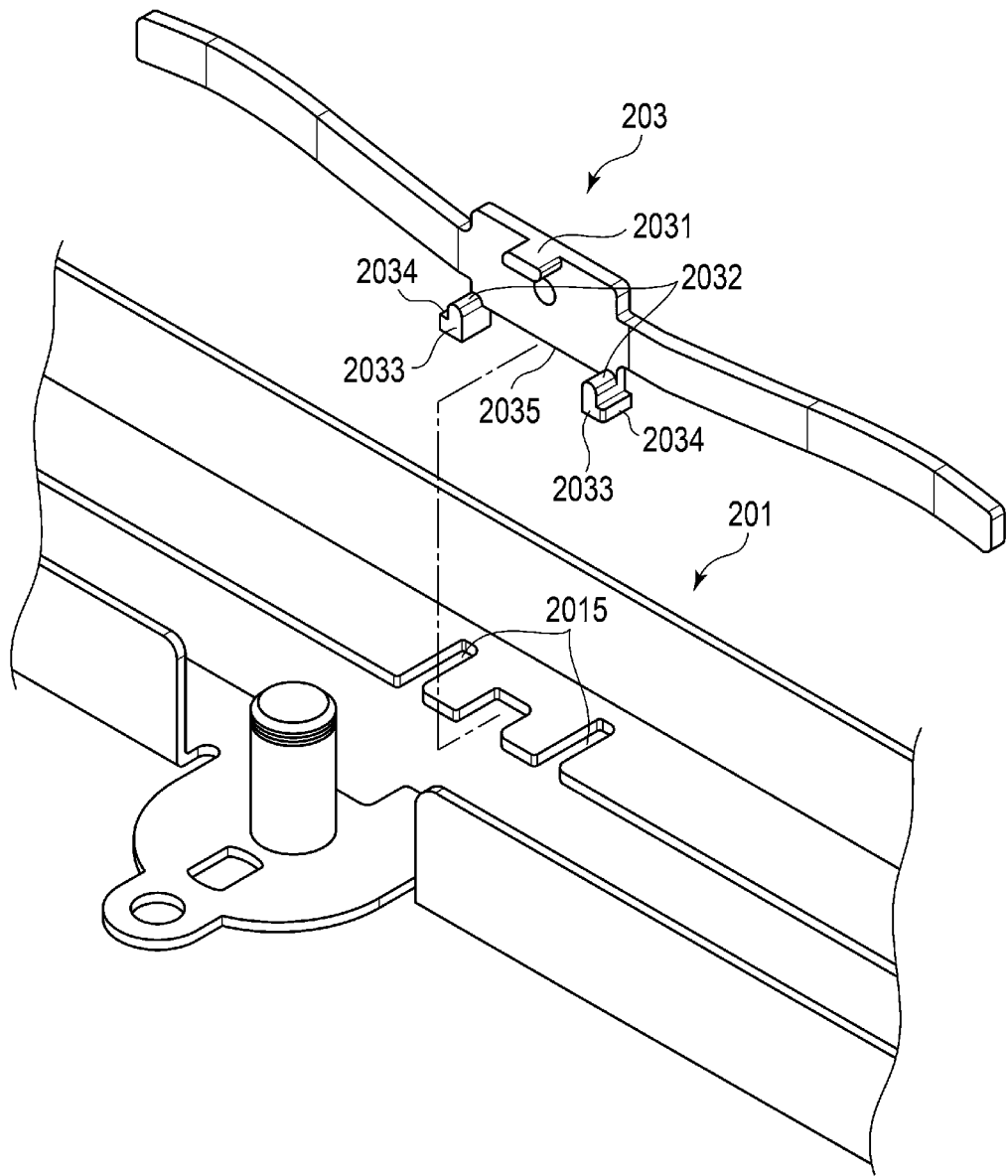
FIG. 17 is a perspective view of central pressing member illustrated in FIGS. 5 to 8.

As illustrated in FIG. 17, the central pressing member 203 includes one warpage suppressing portion 2031 and a pair of warpage suppressing portions 2032. All of the warpage suppressing portion 2031 and the warpage suppressing portions 2032 extend in the sub-scanning direction toward the inner side of the fθ lens 1821. The warpage suppressing portion 2031 and the warpage suppressing portions 2032 are in contact with the upper surface and the lower surface of the peripheral edge portion of the fθ lens 1821, respectively. Here, the upper surface and the lower surface are surfaces positioned on the upstream side and the downstream side in a traveling path of the light beam BY (see FIG. 3), respectively. In addition, protrusions 2033 provided in the central pressing member 203 and groove portions 2015 provided in the holder frame 201 fit into each other, so as to be able to move in the sub-scanning direction. Stepped portions 2034 provided in the end portions of the protrusions 2033 are caught on the back sides of the groove portions 2015 to suppress the upward warpage. In case of a downward warpage, a bottom surface 2035 of the central pressing member 203 abuts on the upper surface of the holder frame 201 to suppress the downward warpage. According to the above actions, the warpage suppressing portion 2031 and the warpage suppressing portions 2032 suppress both the upward warpage and the downward warpage of the fθ lens 1821 in the central portion of the fθ lens 1821 in the optical axis direction.

As illustrated in FIGS. 6 to 8, the curvature adjustment mechanism specifically includes an eccentric cam 202 and a stopper 205. The eccentric cam 202 and the stopper 205 are provided on a rotation axis 206 provided to stand on the holder frame 201. The rotation axis 206 stands in parallel to the optical axis of the fθ lens 1821. An E-ring 207 is attached to the tip end portion of the rotation axis 206. Accordingly, the eccentric cam 202 and the stopper 205 are prevented from being fallen from the rotation axis 206.

The stopper 205 is attached to the holder frame 201 so as not to rotate with respect to the rotation axis 206. Meanwhile, the eccentric cam 202 is supported rotatably about the rotation axis 206.

The curvature adjustment mechanism is operated by an adjustment tool 302 (see FIG. 16) inserted from the outside of the optical scanning device 116. Therefore, the holder frame 201 includes a hole 2018 into which the adjustment tool 302 is inserted. The adjustment tool 302 is described below.

Figure 9:
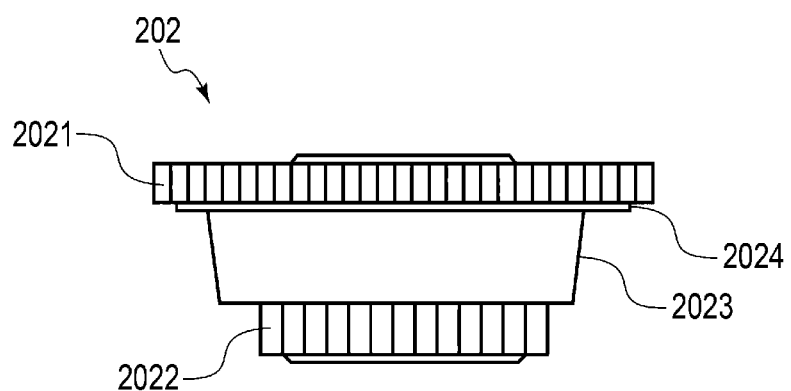
FIG. 9 is a side view of an eccentric cam illustrated in FIGS. 5 to 8.
Figure 10:
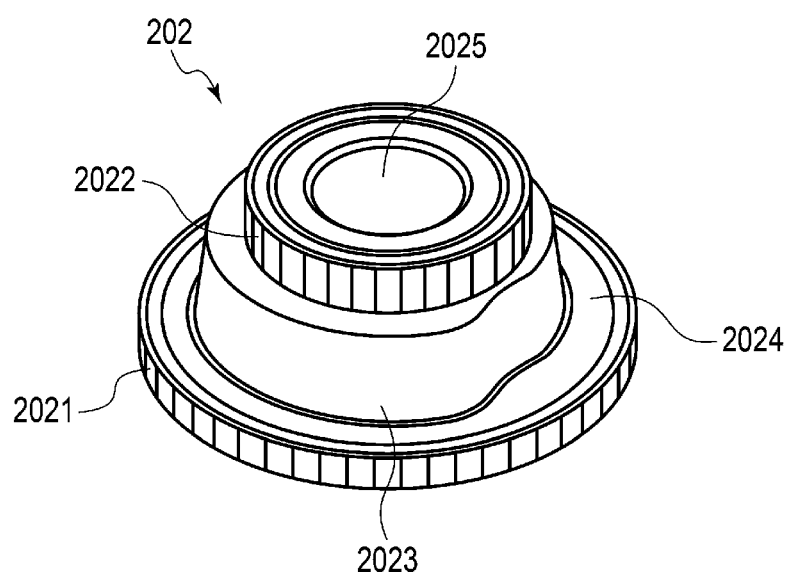
FIG. 10 is a perspective view of the eccentric cam illustrated in FIG. 9.
Figure 11:
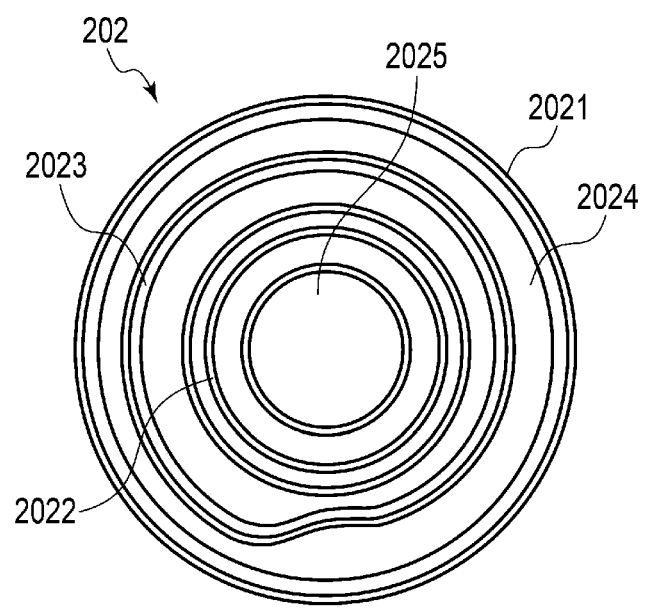
FIG. 11 is a plan view of the eccentric cam illustrated in FIG. 10.

Hereinafter, with reference to FIGS. 9 to 11, the eccentric cam 202 is described. FIG. 9 is a side view of the eccentric cam 202. FIG. 10 is a perspective view of the eccentric cam 202. In FIG. 10, for better understanding, the eccentric cam 202 is illustrated upside down with respect to FIGS. 5 to 9. FIG. 11 is a plan view of the eccentric cam 202. In FIG. 11, the eccentric cam 202 is illustrated so that the lower side of the eccentric cam 202 is on the upper side of the drawing.

The eccentric cam 202 includes a gear portion 2021, a gear portion 2022, a cam portion 2023, a brim portion 2024, and a shaft hole 2025.

The shaft hole 2025 is a through hole through which the rotation axis 206 passes. By the passage of the rotation axis 206 through the shaft hole 2025, the eccentric cam 202 is supported rotatably according to the rotation of the rotation axis 206.

The gear portion 2021 is a disk portion having the same center as the shaft hole 2025 and includes a plurality of teeth on the circumferential surface of the disk portion. The circumferential surface of the disk portion is positioned to be farthest from the central axis of the shaft hole 2025 among constituent parts of the eccentric cam 202. For example, the plurality of teeth are formed at the same angular interval with respect to the angular direction around the central axis of the shaft hole 2025. The gear portion 2021 is a portion that engages with the adjustment tool 302 in order to adjust the curvature amount of the fθ lens 1821. The adjustment tool 302 is described below.

The gear portion 2022 is a cylindrical portion having the same center as the shaft hole 2025 and includes a plurality of grooves on the circumferential surface of the cylindrical portion. For example, the plurality of grooves are formed at the same angular intervals with respect to the angular direction around the central axis of the shaft hole 2025. However, the plurality of grooves are not necessarily formed at the same angular intervals with respect to the angular direction around the central axis of the shaft hole 2025. The gear portion 2022 is a portion that engages with the stopper 205 in order to regulate the angular position.

The cam portion 2023 has an outer peripheral surface that is eccentric with respect to the central axis of the shaft hole 2025. That is, the radius of the outer peripheral surface of the cam portion 2023 changes according to the angular position around the rotation axis 206. For example, the radius of the outer peripheral surface of the cam portion 2023 changes in proportion to the increase in the angular position in a predetermined angular range.

In addition, the outer peripheral surface of the cam portion 2023 is not parallel to the central axis of the shaft hole 2025 and is inclined to the central axis of the shaft hole 2025. The inclination angle of the outer peripheral surface of the cam portion 2023 is set to be the same as the inclination angle (draft angle) of the fθ lens 1821.

The brim portion 2024 is provided on the lower surface of the gear portion 2021. Here, the lower surface of the gear portion 2021 is the surface, for example, on the side where the cam portion 2023 is positioned. The brim portion 2024 is a position around the cam portion 2023. The brim portion 2024 is in contact with the upper surface of the peripheral edge portion of the fθ lens 1821 (see FIG. 8) to suppress the upward warpage of the fθ lens 1821.

Figure 12:
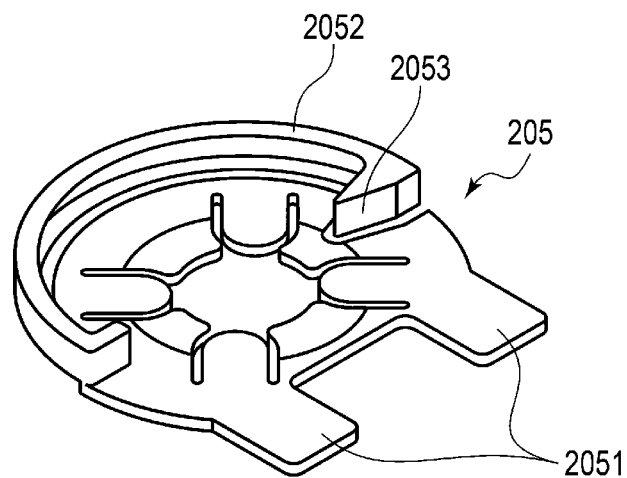
FIG. 12 is a perspective view of a stopper illustrated in FIG. 6.
Figure 13:
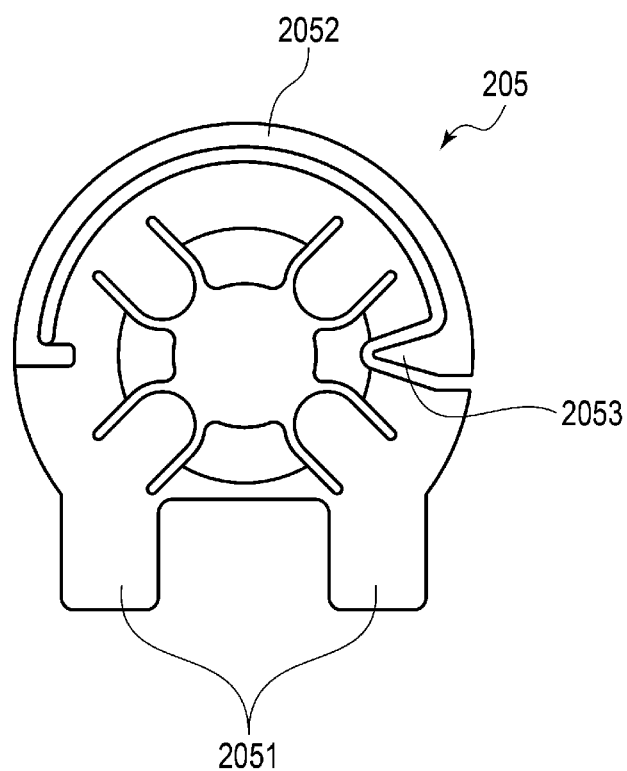
FIG. 13 is a plan view of the stopper illustrated in FIG. 12.

Subsequently, with respect to FIGS. 12 and 13, the stopper 205 is described. FIG. 12 is a perspective view of the stopper 205. FIG. 13 is a plan view of the stopper 205. The stopper 205 cooperates with the gear portion 2022 of the eccentric cam 202 to configure a fixing mechanism that stepwise fixes the angular position of the rotation of the eccentric cam 202 about the rotation axis 206.

The stopper 205 is attached to the holder frame 201 so as not to rotate with respect to the rotation axis 206. The stopper 205 includes a pair of warpage suppressing portions 2051 and a lever portion 2052.

The warpage suppressing portions 2051 are in contact with the lower surface of the peripheral edge portion of the fθ lens 1821 (see FIGS. 6 and 8) to suppress the downward warpage of the fθ lens 1821.

One end of the lever portion 2052 is fixed, and the other end thereof is a free end. The lever portion 2052 can be elastically deformed and extends in a semicircular shape. The lever portion 2052 includes a claw portion 2053 at the free end. The claw portion 2053 enters one of the plurality of grooves of the gear portion 2022 of the eccentric cam 202 to regulate the rotation of the eccentric cam 202.

Figure 14:
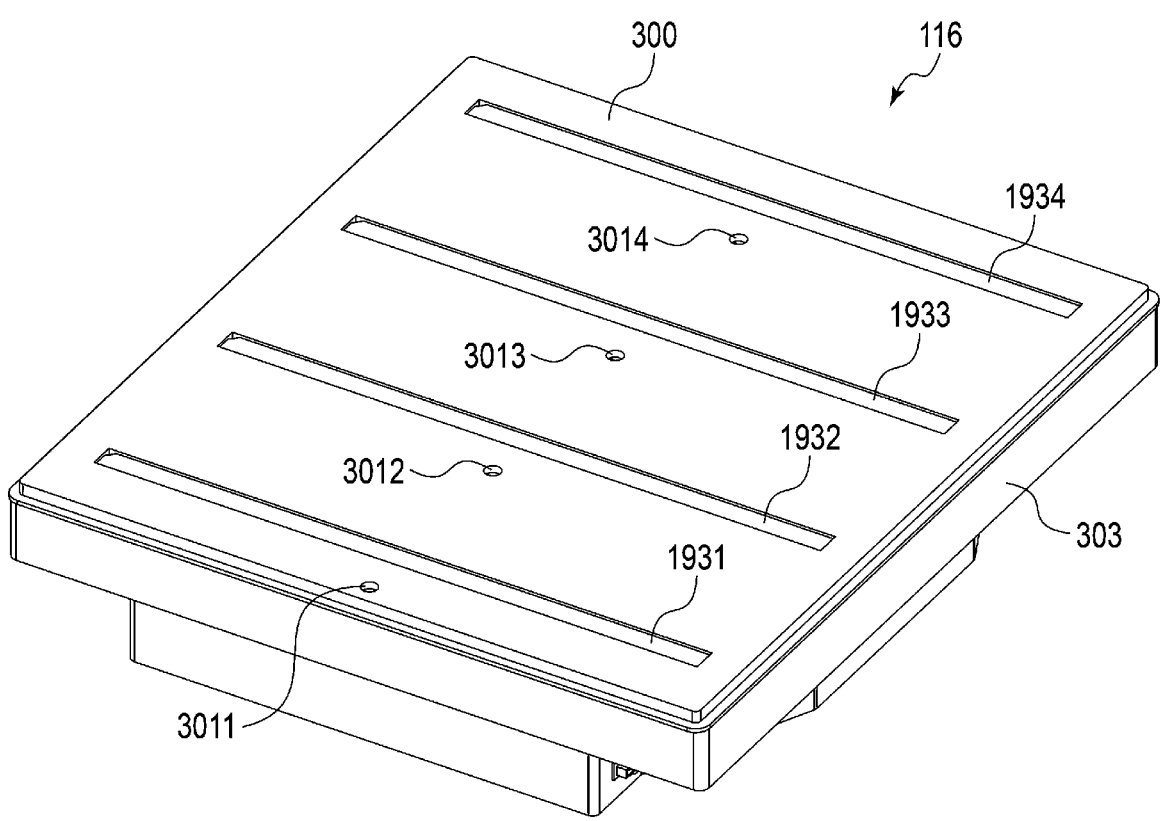
FIG. 14 is a perspective view of the optical scanning device illustrated in FIG. 3.
Figure 15:
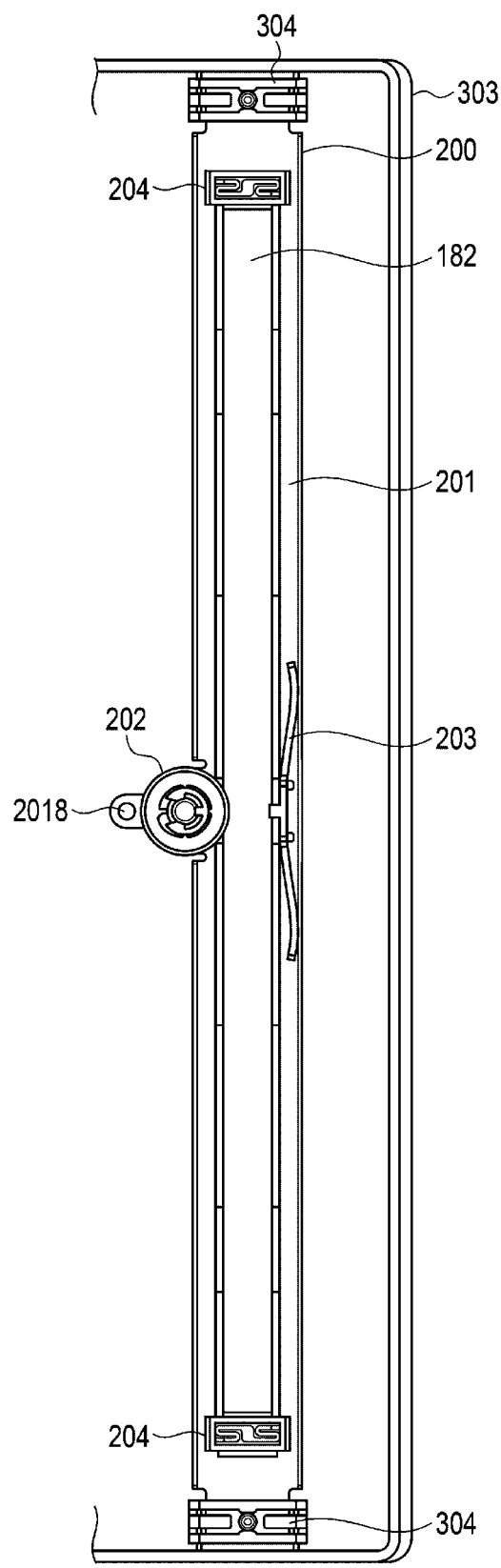
FIG. 15 is a diagram illustrating a state in which the fθ lens holder mechanism illustrated in FIG. 7 is attached to the optical scanning device housing illustrated in FIG. 14.
Figure 16:
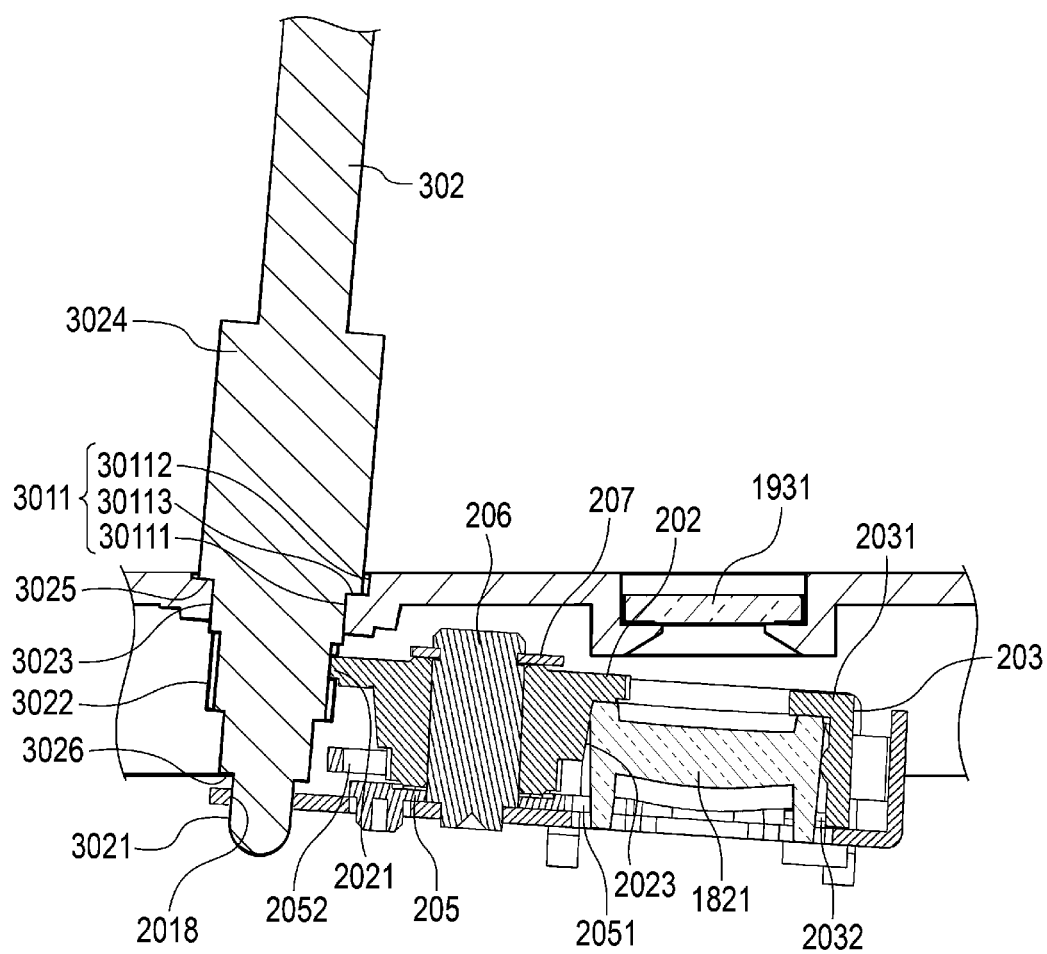
FIG. 16 is a cross-sectional view illustrating the optical scanning device of FIG. 14 when a curvature amount of an fθ lens is adjusted from the outside.

Subsequently, with respect to FIGS. 14 to 16, the adjustment of the curvature amount of the fθ lens 1821 is described. FIG. 14 is a perspective view of the optical scanning device 116. FIG. 15 is a diagram illustrating a state in which the fθ lens holder mechanism 200 is attached to an optical scanning device housing 303. FIG. 16 is a cross-sectional view illustrating a case where the curvature amount of the fθ lens 1821 is performed from the outside of the optical scanning device 116 is adjusted. FIG. 15 illustrates a cross section of the optical scanning device 116 corresponding to a cross section of the fθ lens holder mechanism 200 illustrated in FIG. 8.

As illustrated in FIG. 14, the optical scanning device 116 includes the optical scanning device housing 303 and an upper cover 300 as a housing that contains components thereof.

The upper cover 300 is equipped with third cover glasses 1931 to 1934. Therefore, in a state where the upper cover 300 is removed from the optical scanning device housing 303, the scanline curvature caused by the third cover glasses 1931 to 1934 cannot be corrected. Therefore, it is required to correct the scanline curvature in a state in which the third cover glasses 1931 to 1934 are present.

Therefore, adjustment holes 3011, 3012, 3013, and 3014 into which the adjustment tool 302 for operating the fθ lens holder mechanism 200 is inserted are formed in the upper cover 300. In order to adjust the curvature amount of the fθ lens 1821, the adjustment hole 3011 is a through hole into which the adjustment tool 302 is inserted. In the same manner, the adjustment holes 3012, 3013, and 3014 are through holes into which the adjustment tool 302 is inserted in order to adjust the curvature amounts of the fθ lenses 1822, 1823, and 1824, respectively.

The adjustment holes 3011, 3012, 3013, and 3014 are closed with an adhesive sheet or the like after the adjustment of the curvature amounts of the fθ lenses 1821, 1822, 1823, and 1824 is completed. Accordingly, the inner space of the optical scanning device 116 is closed.

As illustrated in FIG. 15, the both end portions of the fθ lens holder mechanism 200 in the main scanning direction are fixed to the optical scanning device housing 303 via a pair of pressing members 304. That is, the fθ lens holder mechanism 200 is attached to the optical scanning device housing 303 in a state in which the both end portions in the main scanning direction are supported.

As illustrated in FIG. 16, the fθ lens holder mechanism 200 is disposed to be inclined to the upper surface of the upper cover 300. The adjustment hole 3011 is formed in the upper cover 300 so that the central axis thereof is parallel to the optical axis of the fθ lens 1821 supported by the fθ lens holder mechanism 200. In addition, the adjustment hole 3011 is formed to have a coaxial positional relationship with respect to the hole 2018 formed in the holder frame 201.

The adjustment hole 3011 is a stepped circular through hole and includes a small diameter portion 30111 and a large diameter portion 30112. The adjustment hole 3011 further includes a stepped surface 30113 that connects the small diameter portion 30111 and the large diameter portion 30112. The stepped surface 30113 is perpendicular to the central axis of the adjustment hole 3011. That is, the stepped surface 30113 is perpendicular to the optical axis of the fθ lens 1821 supported by the fθ lens holder mechanism 200.

The adjustment tool 302 is a stepped cylindrical shaft structure and includes a tip shaft portion 3021, a gear portion 3022, an intermediate shaft portion 3023, and a large diameter shaft portion 3024 in this order from the tip.

The tip shaft portion 3021 is a portion that is inserted into the hole 2018 formed in the holder frame 201 of the fθ lens holder mechanism 200.

The gear portion 3022 includes a plurality of teeth that mesh with the gear portion 2021 of the eccentric cam 202 on the circumferential surface.

The intermediate shaft portion 3023 has an outer diameter larger than the outer diameter of the gear portion 3022 and is a portion that is inserted into the small diameter portion 30111 of the adjustment hole 3011.

The large diameter shaft portion 3024 has an outer diameter larger than the outer diameter of the intermediate shaft portion 3023. Therefore, the adjustment tool 302 includes a stepped portion 3025 behind the gear portion 3022. Specifically, the adjustment tool 302 includes the stepped portion 3025 at the boundary between the intermediate shaft portion 3023 and the large diameter shaft portion 3024. The stepped portion 3025 adjoins the stepped surface 30113 of the adjustment hole 3011 to regulate the insertion amount of the adjustment tool 302. The stepped portion 3025 adjoins the stepped surface 30113 of the adjustment hole 3011 to regulate the gear portion 3022 of the adjustment tool 302 to advance beyond the position of being meshed with the gear portion 2021 of the eccentric cam 202.

If the adjustment tool 302 is inserted into the adjustment hole 3011 of the upper cover 300, the angular position around the central axis of the adjustment tool 302 is adjusted so that the gear portion 3022 of the adjustment tool 302 is meshed with the gear portion 2021 of the eccentric cam 202.

In the adjustment tool 302, the outer diameter of the intermediate shaft portion 3023 is larger than the outer diameter of the gear portion 3022, and thus the adjustment tool 302 can be inserted into the adjustment hole 3011 without interference with the adjustment hole 3011.

The stepped portion 3025 of the adjustment tool 302 adjoins the stepped surface 30113 of the adjustment hole 3011 to prevent the further insertion of the adjustment tool 302. Accordingly, the position of the adjustment tool 302 is determined along the central axis.

In the position determination state, the tip shaft portion 3021 of the adjustment tool 302 is inserted into the hole 2018 of the holder frame 201 substantially without a gap, and the intermediate shaft portion 3023 of the adjustment tool 302 is inserted into the small diameter portion 30111 of the adjustment hole 3011 substantially without a gap. Therefore, the adjustment tool 302 is rotatably supported around the central axis accurately and stably. As a result, the rotation of the adjustment tool 302 satisfactorily is transmitted to the eccentric cam 202 via the gear portion 3022 and the gear portion 2021 without tooth skipping.

In addition, in the position determination state, a stepped portion 3026 that is present on the tip shaft portion 3021 is separated from the holder frame 201. Accordingly, the stepped portion 3026 abuts the holder frame 201 to avoid the problem of applying a moment to the holder frame 201 so that the position of the fθ lens holder mechanism 200 is shifted.

The shift of the position of the fθ lens holder mechanism 200 means that the position of the fθ lens 1821 mounted thereon is shifted. This causes the deterioration of optical performance. Examples of the deterioration of optical performance include the position shift of a light beam in sub-scanning direction or fluctuations of the diameter of a light beam.

According to the rotation of the adjustment tool 302, the eccentric cam 202 rotates. According to the rotation of the eccentric cam 202, the position of the cam portion 2023 of the eccentric cam 202 that is in contact with the fθ lens 1821 changes. As described above, the radius of the outer peripheral surface of the cam portion 2023 changes in response to the angular position around the rotation axis 206. This changes the position of the central portion of the fθ lens 1821 in the sub-scanning direction.

For example, as the radius of outer peripheral surface of the cam portion 2023 increases, the pressing amount of the cam portion 2023 to the central portion of the fθ lens 1821 increases, so that the central portion of the fθ lens 1821 approaches to the side of the central pressing member 203. In contrast, as the radius of outer peripheral surface of the cam portion 2023 decreases, the pressing amount of the cam portion 2023 to the central portion of the fθ lens 1821 decreases, so that the central portion of the fθ lens 1821 approaches to the side of the eccentric cam 202.

The claw portion 2053 formed at the free end of the lever portion 2052 enters one of the grooves provided on the outer peripheral surface of the gear portion 2022 of the eccentric cam 202, and thus the stopper 205 regulates the rotation of the eccentric cam 202.

In addition, while the eccentric cam 202 is rotated by the adjustment tool 302, due to the elastic deformation of the lever portion 2052, the claw portion 2053 repeats the separation from one of the grooves of the gear portion 2022 and the entrance into an adjacent groove.

After the completion of the rotation of the eccentric cam 202 by the adjustment tool 302, that is, after the adjustment completion, the claw portion 2053 enters one of the grooves of the gear portion 2022 and determines the angular position of the eccentric cam 202.

In this manner, the angular position of the eccentric cam 202 is stepwisely adjusted based on the angular intervals of the plurality of grooves formed on the circumferential surface of the gear portion 2022. Accordingly, the curvature amount of the fθ lens 1821 in the sub-scanning direction is stepwisely adjusted. That is, the curvature adjustment mechanism including the eccentric cam 202 and the stopper 205 can stepwisely adjust the curvature of the fθ lens 1821 in the sub-scanning direction.

In other words, the change amount of the outer diameter of the cam portion 2023 of the eccentric cam 202 can be divided based on the angular intervals of the grooves provided on the circumferential surface of the gear portion 2022. That is, the adjustment amount of the curvature of the fθ lens 1821 in the sub-scanning direction can be divided.

The adjustment of the curvature amount of the fθ lens 1821, that is, the correction of the scanline curvature of the post-deflection optical system 1801 is performed as follows.

First, in a state in which the optical scanning device 116 is assembled, the scanline curvature amount of the post-deflection optical system 1801 on the image plane, that is, the front surface of the photoconductor drum 11511 is measured. Subsequently, the correction amount is calculated based on the measured scanline curvature amount, and the index of the correction amount is shown to an adjuster. The index of the correction amount is information indicating that the eccentric cam 202 is rotated in which direction and by how many grooves of the gear portion 2022. The adjuster adjusts the curvature amount of the fθ lens 1821 according to the index of the shown correction amount.

Since the scanline curvature of the post-deflection optical system 1801 is corrected according to the adjustment of the curvature amount of the fθ lens 1821 like this, the scanline curvature of the post-deflection optical system 1801 can be corrected with high accuracy without being affected by individual differences of the adjuster.

In the embodiment, the configuration example in which the adjustment tool 302 includes the stepped portion 3025 behind the gear portion 3022 is described, but the configuration of the adjustment tool 302 is not limited to this. The adjustment tool 302 may be configured so that a portion behind the gear portion 3022 of the adjustment tool 302 adjoins the stepped surface 30113 of the adjustment hole 3011 to prevent further insertion. For example, the adjustment tool 302 may be a cone or a deformed shape thereof, a pyramid or a deformed shape thereof, a trident or a deformed shape thereof, or a shape similar to a hole cutter.

If there is no adverse effect even if the adjustment tool 302 is perpendicularly inserted into the upper surface of the upper cover 300 and the curvature adjustment mechanism is operated, the stepped surface 30113 around the adjustment hole 3011 is not required, and a portion behind the gear portion 3022 of the adjustment tool 302 may be configured to adjoin the upper surface of the upper cover 300 around the adjustment hole 3011.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
    a photoconductor;
    an optical scanning device configured to form a latent image on the photoconductor, the optical scanning device comprising:
        a light source configured to emit a light beam,
        an optical scanner configured to deflect the light beam emitted from the light source in a plane,
        an imaging optical system configured to image the light beam deflected by the optical scanner, and
        a scanline curvature correction mechanism configured to correct a scanline curvature of the imaging optical system, the scanline curvature correction mechanism comprising:
            a holding mechanism configured to extend in a main scanning direction of the optical scanning device and hold both ends of an imaging optical element comprised in the imaging optical system in the main scanning direction,
            a pressing member provided near a center of the imaging optical element in the main scanning direction and configured to press the imaging optical element of the optical scanning device in the sub-scanning direction, and
            a curvature adjustment mechanism provided on an opposite side of the pressing member with the imaging optical element interposed therebetween and configured to adjust a curvature of the imaging optical element in the sub-scanning direction, the curvature adjustment mechanism comprising:
                an eccentric cam configured to rotate around a rotational axis parallel to an optical axis of the imaging optical element and comprise a cam portion of which an outer peripheral surface is eccentric with respect to the rotational axis, and
                a fixing mechanism configured to fix stepwisely an angular position of rotation of the eccentric cam; and
    a developing device configured to develop the latent image.

2. The image forming apparatus according to claim 1, wherein
    the fixing mechanism comprises:
    a gear portion provided in the eccentric cam and include
        a plurality of grooves formed along a circumferential surface about the rotational axis, and
    a stopper fixed to a frame provided with the rotation axis, the stopper comprising:
        an elastically deformable lever portion configured to be held on the frame, and
        a claw portion formed in the lever portion and configured to enter one of the plurality of grooves of the gear portion to regulate rotation of the eccentric cam.

3. The image forming apparatus according to claim 2, wherein the plurality of grooves are positioned at a constant angular interval on the circumferential surface of the gear portion with respect to an angular direction about the rotational axis.

4. The image forming apparatus according to claim 1, wherein
    the optical scanning device comprises a housing that contains the light source, the optical scanner, the imaging optical system, the scanline curvature correction mechanism, and an adjustment hole into which an adjustment tool with a gear portion to be meshed with a gear portion of the eccentric cam is inserted.

5. The image forming apparatus according to claim 4, wherein
    the adjustment hole is in contact with the adjustment tool and regulates the gear portion of the adjustment tool to advance beyond a position of being meshed with the gear portion of the eccentric cam.

6. The image forming apparatus according to claim 4, wherein
    the adjustment tool comprises one of a cone shape, a pyramid shape, or a trident shape.

7. The image forming apparatus according to claim 1, wherein
    the optical scanner is a polygon mirror.

8. An optical scanning device configured to form a latent image on a photoconductor, the optical scanning device comprising:
    a light source configured to emit a light beam,
    an optical scanner configured to deflect the light beam emitted from the light source in a plane,
    an imaging optical system configured to image the light beam deflected by the optical scanner, and
    a scanline curvature correction mechanism configured to correct a scanline curvature of the imaging optical system, the scanline curvature correction mechanism comprising:
        a holding mechanism configured to extend in a main scanning direction of the optical scanning device and hold both ends of an imaging optical element comprised in the imaging optical system in the main scanning direction,
        a pressing member provided near a center of the imaging optical element in the main scanning direction and configured to press the imaging optical element of the optical scanning device in the sub-scanning direction, and a curvature adjustment mechanism provided on an opposite side of the pressing member with the imaging optical element interposed therebetween and configured to adjust a curvature of the imaging optical element in the sub-scanning direction, the curvature adjustment mechanism comprising:

an eccentric cam configured to rotate around a rotational axis parallel to an optical axis of the imaging optical element and comprise a cam portion of which an outer peripheral surface is eccentric with respect to the rotational axis, and a fixing mechanism configured to fix stepwisely an angular position of rotation of the eccentric cam.

9. The optical scanning device according to claim 8, wherein the fixing mechanism comprises:

a gear portion provided in the eccentric cam and include a plurality of grooves formed along a circumferential surface about the rotational axis, and a stopper fixed to a frame provided with the rotation axis, the stopper comprising:

an elastically deformable lever portion configured to be held on the frame, and a claw portion formed in the lever portion and configured to enter one of the plurality of grooves of the gear portion to regulate rotation of the eccentric cam.

10. The optical scanning device according to claim 9, wherein the plurality of grooves are positioned at a constant angular interval on the circumferential surface of the gear portion with respect to an angular direction about the rotational axis.

11. The optical scanning device according to claim 8, wherein the optical scanning device comprises a housing that contains the light source, the optical scanner, the imaging optical system, the scanline curvature correction mechanism, and an adjustment hole into which an adjustment tool with a gear portion to be meshed with a gear portion of the eccentric cam is inserted.

12. The optical scanning device according to claim 11, wherein the adjustment hole is in contact with the adjustment tool and regulates the gear portion of the adjustment tool to advance beyond a position of being meshed with the gear portion of the eccentric cam.

13. The optical scanning device according to claim 11, wherein the adjustment tool comprises one of a cone shape, a pyramid shape, or a trident shape.

14. The optical scanning device according to claim 8, wherein the optical scanner is a polygon mirror.

15. An adjustment method for an image forming apparatus, comprising:

holding an imaging optical element in a main scanning direction; emitting a light beam;

deflecting the light beam emitted from the light source in a plane;

imaging, through the imaging optical element, the light beam deflected; and adjusting a curvature of the imaging optical element in a sub-scanning direction by:

rotating an eccentric cam around a rotational axis parallel to an optical axis of the imaging optical element, the eccentric cam pressing the imaging optical element in the sub-scanning direction; and fixing stepwisely an angular position of rotation of the eccentric cam.

16. The optical method according to claim 15, further comprising:

holding an elastically deformable lever portion on a frame; and entering a claw portion into one of a plurality of grooves of a gear portion to regulate rotation of the eccentric cam.

17. The optical method according to claim 16, wherein the plurality of grooves are positioned at a constant angular interval on the circumferential surface of the gear portion with respect to an angular direction about the rotational axis.

* * * * *